Oct. 27, 1959  C. W. SINCLAIR  2,910,107
RIM

Filed Dec. 7, 1953  2 Sheets-Sheet 1

INVENTOR.
CHARLES W. SINCLAIR.
BY
Whittemore Hulbert & Belknap

Oct. 27, 1959 — C. W. SINCLAIR — 2,910,107
RIM
Filed Dec. 7, 1953 — 2 Sheets-Sheet 2
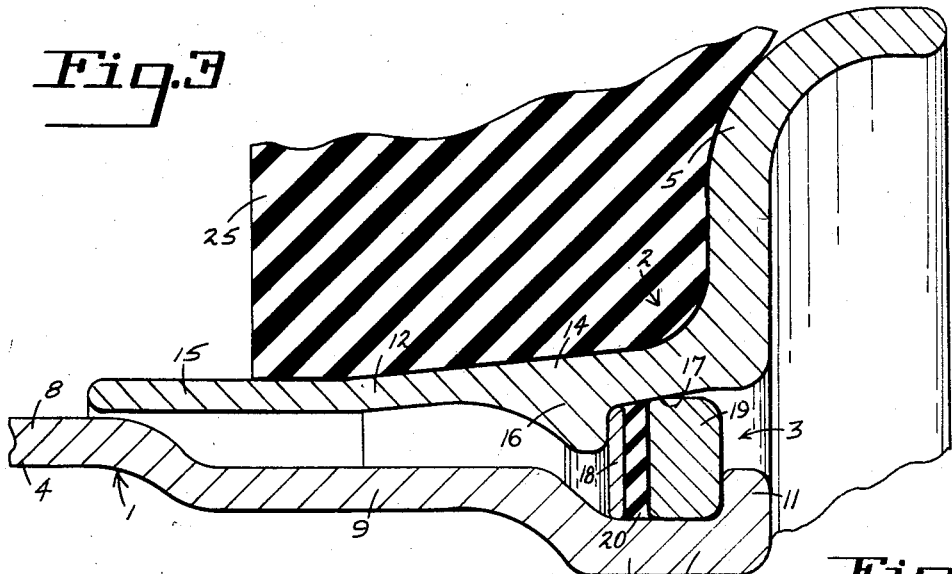
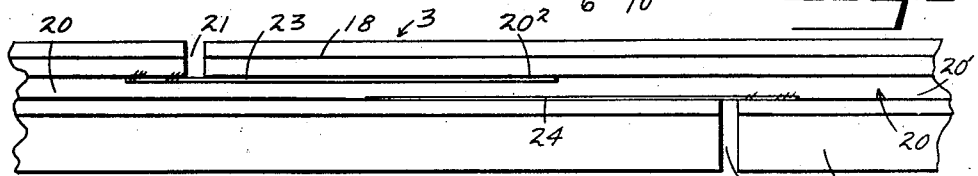
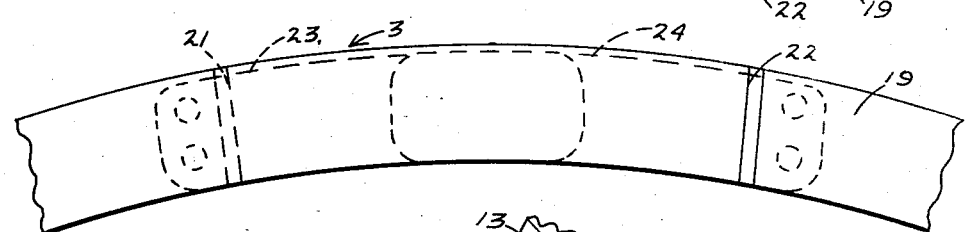
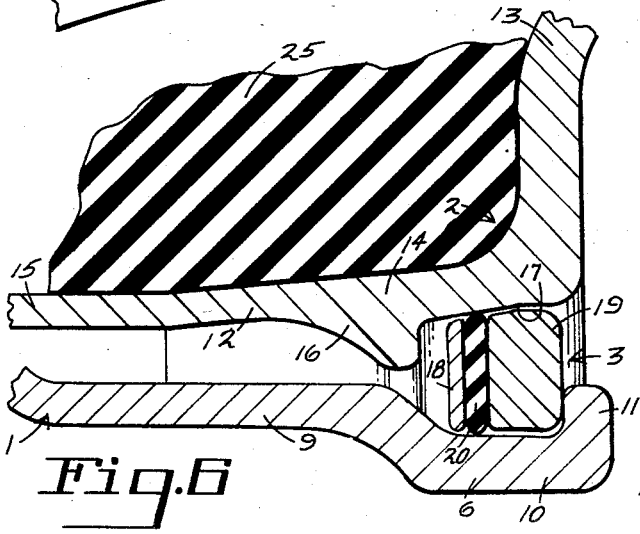
INVENTOR.
CHARLES W. SINCLAIR.
BY
Whittemore Hulbert & Belknap United States Patent Office 2,910,107
Patented Oct. 27, 1959

2,910,107

RIM

Charles W. Sinclair, Detroit, Mich., assignor to Kelsey-Hayes Company, a corporation of Delaware Application December 7, 1953, Serial No. 396,403

11 Claims. (Cl. 152—410)

The invention relates to rims and refers more particularly to rims for pneumatic tubeless tires.

The invention has for one of its objects to provide an improved rim constructed to facilitate mounting and demounting of the tubeless tire and to effectively maintain the air pressure.

The invention has for another object to provide an improved rim comprising an endless annular base member, an endless tire retaining ring member, and a clamping ring member which, in addition, to effectively securing the members together when the tubeless tire is inflated effectively maintains the air pressure.

The invention has for another object to provide the rim with an improved clamping ring member constructed to retain the air during the initial inflation of the tubeless tire before the rim members are in their final assembled positions relative to each other.

These and other objects of the invention will become apparent from the following description taken in connection with the accompanying drawings in which—

Figure 3 is an enlarged view of a portion of Figure 2;

Figure 4 is an enlarged elevation of a portion of the clamping ring member;

Figure 5 is a top plan view of Figure 4;

Figure 6 is a view similar to Figure 3 showing the rim members in relative positions occupied during the preliminary assembly.

Figure 1:
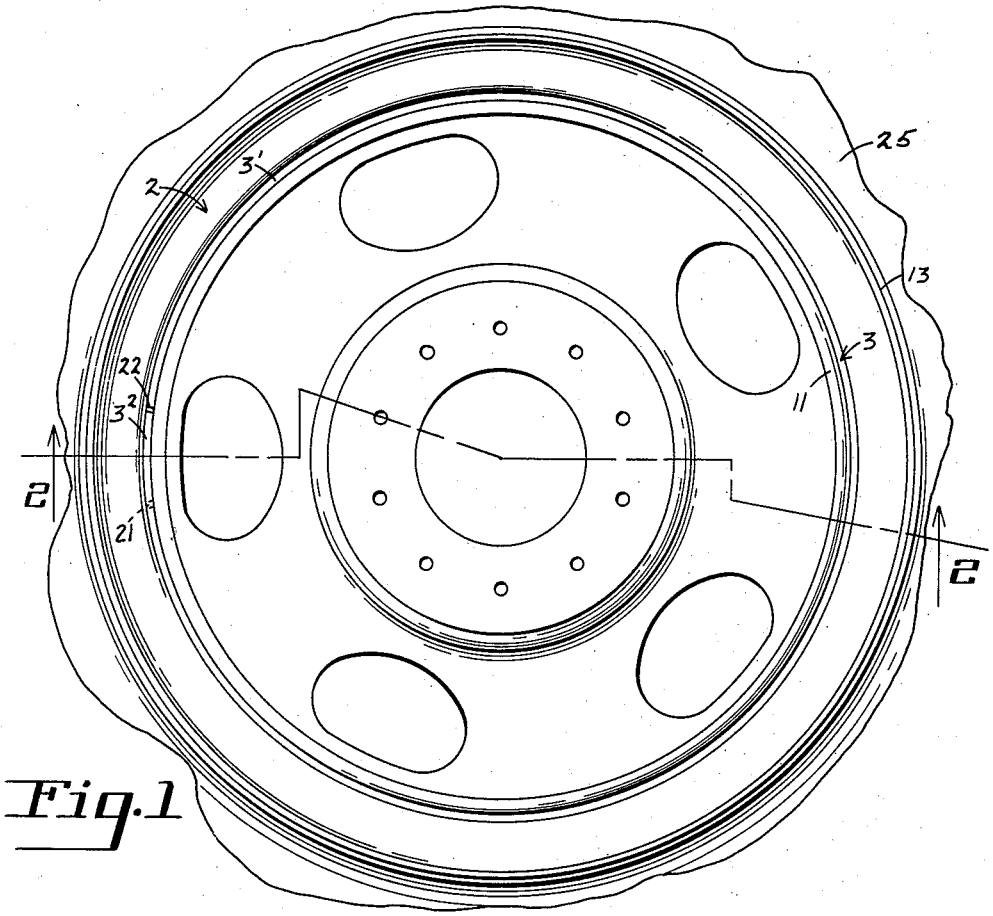
Figure 1 is an elevation of a wheel having a rim embodying the invention.
Figure 2:
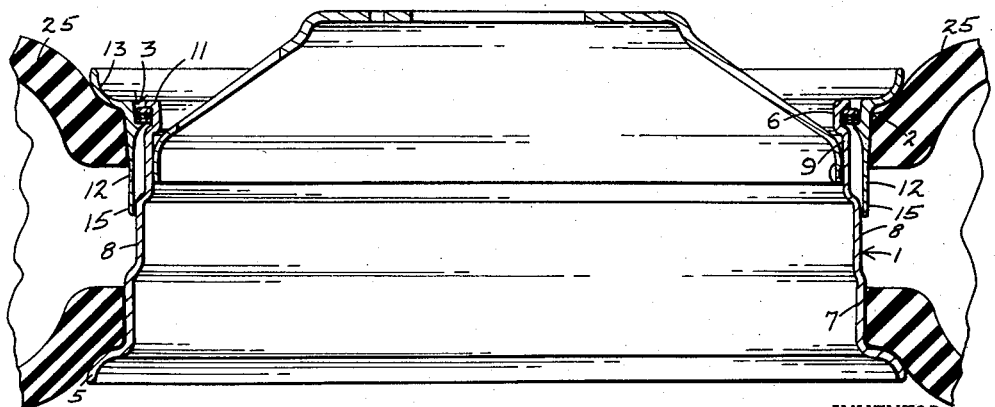
Figure 2 is a cross section on the line 2—2 of Figure 1.

The rim is designed for use with pneumatic tubeless tires and, as illustrated, forms part of a motor vehicle wheel. In general, the rim comprises the annular base member 1, the detachable tire retaining ring member 2, and the detachable clamping ring member 3 for retaining the tire retaining ring member on the base member.

The base member 1 is endless and has the annular base 4, the annular tire retaining flange 5 extending generally radially outwardly from one edge of the base, and the annular gutter 6 at the other edge of the base. The base is formed with the annular tire bead seat portion 7 flared toward and connecting into the tire retaining flange 5, the axially extending annular portion 8 leading from the bead seat portion, and the axially extending annular portion 9 between the annular portion 8 and the gutter 6. The annular base portion 9 has an external diameter less than that of the annual portion 8. The bottom wall 10 of the gutter extends axially and has an external diameter less than that of the annular base portion 9, and the axially outer radially extending terminal side wall 11 of the gutter has an external diameter which is preferably slightly less than the external diameter of the annular base portion 9. This terminal side wall presents a substantially radial axially inwardly facing surface.

The tire retaining ring member 2 is endless and has the tire bead seat portion 12, and the integral tire retaining flange portion 13 extending generally radially outwardly from the axially outer edge of the tire bead seat portion. This tire bead seat portion is formed with the axially outwardly flared part 14 connecting into the tire retaining flange portion 13 and the axially extending part 15 which latter is adapted to freely encircle the annular portion 8 of the base. The tire retaining member has the annular rib 16 which extends radially inwardly from the tire bead seat portion 12 and presents a substantially radial axially outwardly facing shoulder, the internal diameter of the rib being greater than the external diameter of the annular portion 9 of the base so that the rib may freely extend over the last mentioned annular portion. The tire retaining ring also has the radially inner surface 17 which flares axially outwardly from its junction with the rib 16.

The clamping ring member 3 is formed of the expansible transversely split clamping rings 18 and 19 and the endless resilient stretchable sealing ring 20 between the clamping rings. The clamping ring member in the final or completely assembled position of the rim members occupies a position between and engaging the bottom wall 10 of the gutter, the radially inner surface 17 of the tire retaining ring member and the terminal side wall 11 and the rib 16. The clamping rings 18 and 19 have radially outer peripheral bearing surfaces which are flared axially outwardly preferably at the same angle as the radially inner surface 17. The clamping rings carry the radial load between the base member and the tire retaining ring member. The beads of the tubeless tire or casing 25 firmly engage the tire bead seat portion 7 and the part 14 of the tire bead seat portion 12 and prevent the escape of air along these tire bead seat portions. The sealing ring 20 effectively seals the gap between the base member and the tire retaining ring member and maintains the pressure of air within the tubeless tire or casing. The minimum and maximum radial sectional dimensions of the peripheral portions of the clamping rings 18 and 19 for engaging the bottom wall 10 of the gutter and the radially inner surface 17 of the tire retaining ring member are normally greater before assembly of the base, tire retaining ring and clamping ring members than the minimum and maximum radial distances respectively between the portions of the bottom wall and radially inner surface with which these clamping rings are in engagement in the final position of assembly of the base, tire retaining ring and clamping ring members. Also, the inner radial dimension of the clamping rings 18 and 19 is normally greater than the outer radial dimension of the bottom wall of the gutter. As a result, during the assembling of the base, tire retaining ring and clamping ring members, the clamping rings have wedging engagement and are contracted against the bottom wall of the gutter and flex either or both the base and tire retaining ring members.

The clamping rings 18 and 19 have the splits 21 and 22, respectively, spaced circumferentially from each other and forming, in effect, the major portion 3' and the minor portion 3² of the clamping ring member at opposite sides of the splits. The sealing ring 20 is preferably formed of rubber and has the major portion 20' permanently secured to the portions of the clamping rings forming the major portion 3', and the sealing ring also has the minor portion 20² at the other sides of the splits free to stretch circumferentially relative to the portions of the clamping rings forming the minor portion 3². The major portion 20' is preferably bonded by a vulcanizing operation to the clamping rings. The minor portion 20² is under tension in the natural or normal state of the clamping ring members before assembly with the base and tire retaining ring members by reason of the resilience of the clamping rings. To facilitate the stretching of the minor portion, there are the thin shields 23 and 24 between the clamping rings 18 and 19, and the minor portion 20², and permanently secured at their remote ends by being welded to the portions of the clamping rings forming the major portions 3', the free adjacent ends of the shields preferably overlapping each other. The minor distance between the splits 21 and 22 is such that the length of the minor portion 20² of the sealing ring is sufficient to enable this minor portion to stretch sufficiently to enable the clamping rings to be expanded over the terminal side wall 11 when assembling or disassembling the clamping ring member.

The sealing ring 20 in its natural state has rounded or convex radially inner and outer edge portions normally spaced from the adjacent sides of the clamping rings and normally extending radially inwardly and radially outwardly beyond the adjacent peripheral portions of the clamping rings. The inner radial dimension of the sealing ring is normally less than the portion of the bottom wall of the gutter engaged by the sealing ring and the outer radial dimension of the sealing ring is normally greater than the portion of the radially inner surface of the tire retaining ring member engaged by the sealing ring during the latter portion of the assembly of the rim parts. Therefore, during the latter portion of the assembly, the radially inner and radially outer edge portions of the sealing ring are displaced toward each other and fill, or substantially fill, the spaces between the clamping rings and the normal edge portions of the sealing ring.

With this construction of rim, the tubeless tire or casing 25 may be readily mounted on the base member 1 of the rim, at which time the tire retaining ring member 2 and the clamping ring member 3 are removed. The tire retaining ring member may then be readily moved over the base member and inserted within the axially outer bead of the tubeless tire or casing. It will be noted that the construction is such that the radially inner faces of the beads of the tubeless tire or casing may be made to tightly fit the tire bead seat portions 7 and 12 of the base and tire retaining ring members. When the tire retaining ring member is in an axially inward position to clear the clamping ring member, the clamping rings 18 and 19 of the latter may be expanded as permitted by the stretching of the minor portion 20² of the sealing ring 20 and the clamping ring member moved over the terminal side wall 11 of the gutter 6 into the gutter. The tire retaining ring member 2 and the adjacent portion of the side wall of the tubeless tire or casing may then be allowed to move axially outwardly or manually moved axially outwardly to occupy the preliminary inflatable position of assembly, as shown in Figure 6, at which time the sealing ring 20 is in sealing engagement with both the bottom wall 10 of the gutter and the radially inner surface 17 of the tire retaining ring member and the radially inner and outer peripheral bearing surfaces of the clamping rings are spaced from the bottom wall of the gutter and the radially inner surface of the tire retaining ring member. Air may then be forced into the tubeless tire or casing to inflate the same and the pressure of the inflating air acting through the tubeless tire or casing against the tire retaining ring member assures engagement of the clamping ring 19 with the terminal side wall 11 and moves the tire retaining ring member to its axially outer position over the clamping ring member. During this axially outward movement of the tire retaining ring member, the radially inner surface 17 of the tire retaining ring member rides over the clamping rings contracting and seating the same on the bottom wall of the gutter and producing a wedging action until the axially outwardly facing shoulder formed by the rib 16 abuts the clamping ring 18. By reason of the minor portion 20² of the sealing ring being normally under tension, the relatively small amount of contraction of the clamping rings with the resultant narrowing of the splits does not result in objectionable upsetting of the minor portion. Also, during this axially outward movement, the edge portions of the sealing ring are displaced toward each other and axially to have extended contact with the bottom wall of the gutter and the radially inner surface of the tire retaining ring member.

From the above description, it will be seen that I have provided an improved construction of rim which facilitates mounting and demounting of the tubeless tire and effectively maintains the air pressure during the latter part of the assembly while the tubeless tire is being inflated and also when the rim parts are in their final assembled positions.

What I claim as my invention is:

1. A rim for a tubeless tire comprising an endless annular base portion provided with an annular gutter at one edge having a bottom wall and a generally radially outwardly extending terminal wall, a detachable tire retaining ring member movable over said terminal wall and having a tire bead seat portion encircling said base portion and a tire retaining flange portion extending generally radially outwardly from the axially outer edge of said tire bead seat portion, said tire bead seat portion being provided with a generally radially inwardly extending rib and a radially inner surface flaring axially outwardly from its junction with said rib, and a clamping ring member movable over said terminal wall and extending within said gutter and engaging said terminal wall and rib and bottom wall and radially inner surface, the minimum and maximum radial sectional dimensions of the portions of said clamping ring member in clamping engagement with said bottom wall and radially inner surface before assembly of said base portion and tire retaining ring member normally being greater than the minimum and maximum radial distances respectively between the portions of said bottom wall and radially inner surface with which said clamping ring member is in clamping engagement, said clamping ring member comprising transversely split clamping rings having their splits spaced circumferentially from each other and an endless resilient stretchable sealing ring between said clamping rings, said sealing ring normally extending radially inwardly and outwardly beyond the adjacent portions of said clamping rings and having sealing engagement with said bottom wall and radially inner surface and being bonded to said clamping rings and having a portion extending between and overlapping the splits free to stretch and move circumferentially relative to said clamping rings, whereby said clamping ring member may be expanded to move over said terminal wall.

2. A rim for a tubeless tire comprising an endless annular base member having a generally radially outwardly extending terminal wall, a detachable endless tire retaining ring member movable over said terminal wall and encircling said base member and having a generally radially inwardly extending rib, and a clamping ring member movable over said terminal wall to a position between and engaging said base and tire retaining ring members, said clamping ring member abutting said terminal wall and rib, and having radial wedging engagement with one of said base and tire retaining ring members, said clamping ring member comprising transversely split clamping rings having their splits spaced circumferentially from each other, and an endless resilient stretchable sealing ring between said clamping rings and having radially inner and outer edges normally extending radially inwardly and outwardly beyond the adjacent portions of the radially inner and outer surfaces of said clamping rings and having sealing engagement with said base and tire retaining ring members, said sealing ring being permanently secured to and being free to stretch and move circumferentially relative to said clamping rings, whereby said clamping ring member may be expanded to move over said terminal wall.

3. A rim for a tubeless tire comprising an endless annular base member, a detachable endless tire retaining ring member movable over said base member, and a clamping ring member located between and having radially inner and outer surfaces engaging said base and tire retaining ring members, said base and tire retaining ring members being provided with substantially radially extending means engaging said clamping ring member to limit axial movement, in one direction, of said tire retaining ring member over said clamping ring member relative to said base member, said clamping ring member comprising transversely split clamping rings, at least one of said clamping rings transmitting radial load between said base and tire retaining ring members, and an endless resilient stretchable sealing ring permanently secured to and intermediate said clamping rings and having an inner radial dimension normally less than the portion of said base member engaged by said sealing ring and an outer dimension normally greater than the portion of said tire retaining ring member engaged by said sealing ring.

4. A clamping ring member for retaining a tire retaining ring member on a base member of a tubeless tire rim, comprising expansible transversely split rings having their splits spaced circumferentially from each other and an endless resilient stretchable sealing ring between said rings having a portion secured thereto and another portion free to move circumferentially relative thereto, said sealing ring having radially inner and outer edge portions normally extending inwardly and outwardly beyond the adjacent peripheral portions of said rings.

5. A clamping ring member for retaining a tire retaining ring member on a base member of a tubeless tire rim, comprising expansible transversely split rings having their splits spaced circumferentially from each other and an endless resilient stretchable sealing ring between said rings having one portion between the splits permanently secured to said rings and the other portion at the other sides of the splits free to move circumferentially relative to said rings, said other portion normally being under circumferential tension and said sealing ring having displaceable radially inner and outer edge portions normally extending inwardly and outwardly beyond the adjacent peripheral portions of said rings.

6. A clamping ring member for retaining a tire retaining ring member on a base member of a tubeless tire rim, comprising expansible transversely split rings having their splits spaced circumferentially from each other and an endless resilient stretchable sealing ring between said rings having a major portion between the splits bonded to said rings and a minor portion at the other sides of the splits free to move circumferentially relative to said rings, shields between said split rings and said minor portion and extending across said splits, said minor portion normally being under circumferential tension and said sealing ring having displaceable radially inner and outer edge portions normally spaced from the adjacent sides of said split rings and extending inwardly and outwardly beyond the adjacent peripheral portions of said split rings.

7. A rim for a tubeless tire comprising an endless annular base member, a detachable endless tire retaining ring member movable over said base member and a clamping ring member located between and having radially inner and outer surfaces engaging said base and tire retaining ring members, said base and tire retaining ring members being provided with substantially radially extending means engaging said clamping ring member to limit axial movement, in one direction, of said tire retaining ring member over said clamping ring member relative to said base member, said clamping ring member comprising clamping rings transmitting radial load between said base and tire retaining ring members and an endless resilient stretchable sealing ring intermediate said clamping rings and having an inner radial dimension normally less than the portion of said base member engaged by said sealing ring and an outer dimension normally greater than the portion of said tire retaining ring member engaged by said sealing ring.

8. A rim for a tubeless tire comprising an endless annular base member, a detachable endless tire retaining ring member movable over said base member and a clamping ring member located between and having radially inner and outer surfaces engaging said base and tire retaining ring members, said base and tire retaining ring members being provided with substantially radially extending means engaging said clamping ring member to limit axial movement, in one direction, of said tire retaining ring member over said clamping ring member relative to said base member, said clamping ring member comprising transversely split clamping rings, both of which transmit radial load between said base and tire retaining ring members, and an endless resilient stretchable sealing ring permanently secured to and intermediate said clamping rings and having an inner radial dimension normally less than the portion of said base member engaged by said sealing ring and an outer dimension normally greater than the portion of said tire retaining ring member engaged by said sealing ring.

9. A clamping ring member for retaining a tire retaining ring member on a base member of a tubeless tire rim, comprising expansible transversely split rings having their splits spaced circumferentially from each other and an endless resilient stretchable sealing ring between said rings having a major portion between the splits bonded to said rings and a minor portion at the other sides of the splits free to move circumferentially relative to said rings, and shields secured to said split rings and extending between said split rings and said minor portion.

10. A clamping ring member for retaining a tire retaining ring member on a base member of a tubeless tire rim, comprising expansible transversely split rings having their splits spaced circumferentially from each other and an endless resilient stretchable sealing ring between said rings having a major portion between the splits bonded to said rings and a minor portion at the other sides of the splits free to move circumferentially relative to said rings, shields secured to said split rings and extending between said split rings and said minor portion, said minor portion normally being under circumferential tension and said sealing ring having displaceable radially inner and outer edge portions normally spaced from the adjacent sides of said split rings and extending inwardly and outwardly beyond the adjacent peripheral portions of said split rings.

11. A clamping ring member for retaining a tire retaining ring member of a base member of a tubeless tire rim, comprising expansible transversely split rings having their splits spaced circumferentially from each other and an endless resilient stretchable sealing ring between said rings having a major portion between the splits bonded to said rings and a minor portion centrally located between the other sides of the splits free to move circumferentially relative to said rings, the portions of the sealing ring immediately adjacent said other side of the splits being bonded to each split ring opposite the split in the other, shields between said split rings and said minor portion and extending across said splits, said minor portion normally being under circumferential tension and said sealing ring having displaceable radially inner and outer edge portions normally spaced from the adjacent sides of said split rings and extending inwardly and outwardly beyond the adjacent peripheral portions of said split rings.

References Cited in the file of this patent

UNITED STATES PATENTS

| | | |
|---|---|---|
| 1,132,898 | Austin | Mar. 23, 1915 |
| 2,234,520 | DeShong | Mar. 11, 1941 |
| 2,434,180 | Sinclair | Jan. 6, 1948 |
| 2,685,907 | Waddell | Aug. 10, 1954 |
| 2,798,529 | Herzegh | July 9, 1957 |
| 2,827,100 | Herzegh | Mar. 18, 1958 |

FOREIGN PATENTS

| | | |
|---|---|---|
| 881,431 | France | Jan. 22, 1943 |